United States Patent [19]

Swidén et al.

[11] 3,886,354

[45] May 27, 1975

[54] ARRANGEMENT FOR OPTICAL SCANNING OF THE SPEED OF A ROTATING DEVICE SUCH AS A VEHICLE WHEEL

[76] Inventors: Lennart Bror Anders Swidén, Bjornsbacken 32, S-59061 Vreta Kloster; Waldemar Lester, Bondegatan 11B, S-582-63 Linkoping, both of Sweden

[22] Filed: Feb. 1, 1974

[21] Appl. No.: 438,729

[30] Foreign Application Priority Data

Feb. 6, 1973  Sweden ........................... 73015935

[52] U.S. Cl. ........... 250/233; 250/231 SE; 250/234; 324/175
[51] Int. Cl. ............................................. G01d 5/36
[58] Field of Search.. 250/233, 234, 231 SE, 237 R; 324/175; 340/263, 271

[56] References Cited
UNITED STATES PATENTS

| | | | |
|---|---|---|---|
| 1,859,597 | 5/1932 | Nason | 250/233 X |
| 2,111,013 | 3/1938 | Veddea | 250/233 X |
| 3,139,529 | 6/1964 | Stauffer | 250/233 X |
| 3,814,934 | 6/1974 | Mesh et al. | 250/231 SE |

*Primary Examiner*—Walter Stolwein

[57] ABSTRACT

A pulsed signal corresponding to rotational speed of a scanning disc is produced by a constant intensity light source beamed towards a photo transistor. In a concentric annular zone of the disc there are circumferentially alternating opaque and transparent areas that respectively block and pass the beam. The transparent areas are rectangular, elongated radially of the disc; the opaque areas, likewise radially elongated, taper radially inwardly. All such areas have the same width on a pitch circle midway between their ends. The light source and the photo transistor, fixed in relation to one another, are adjustable in directions along a radial of the disc to compensate for photo transistor retardation times so that "one" and "zero" pulses are of equal duration at constant disc speed.

2 Claims, 5 Drawing Figures

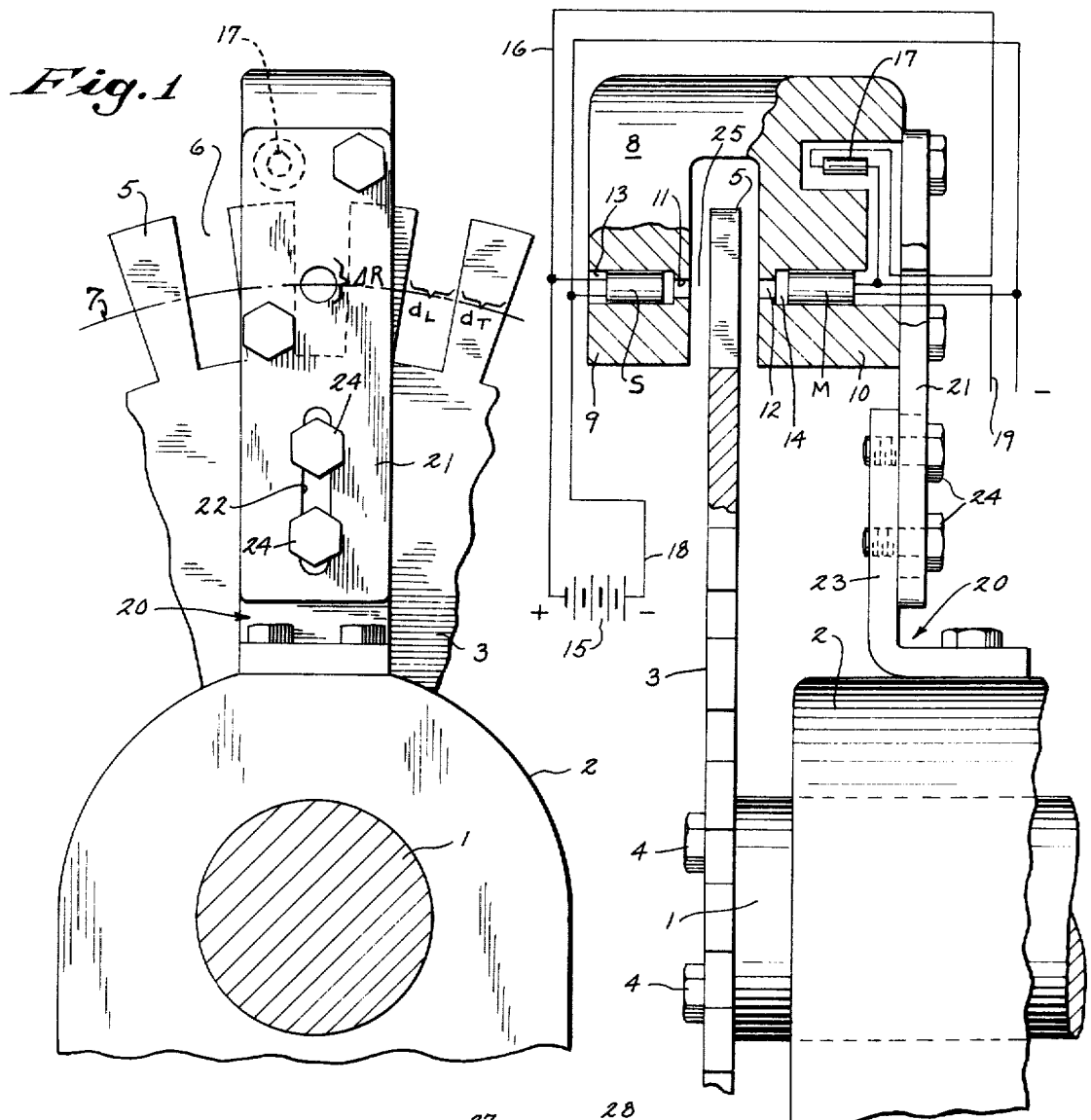
Fig. 1
Fig. 2
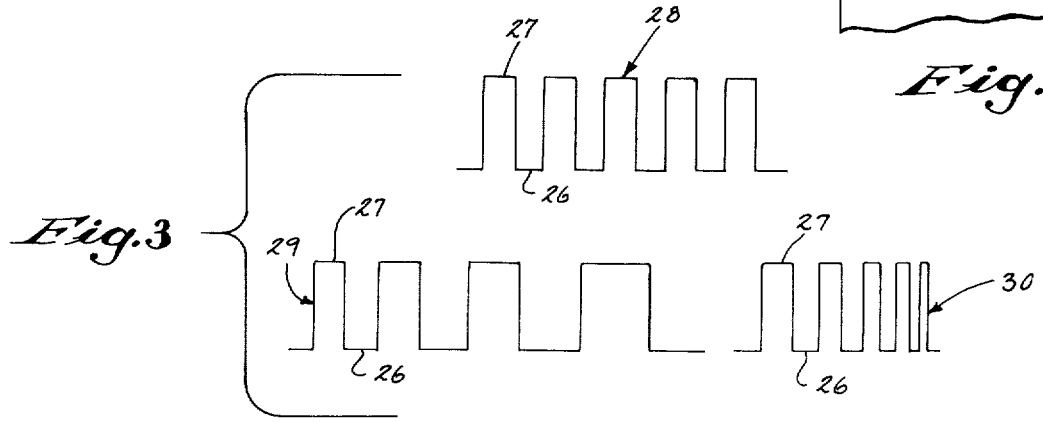
Fig. 3

ARRANGEMENT FOR OPTICAL SCANNING OF THE SPEED OF A ROTATING DEVICE SUCH AS A VEHICLE WHEEL

This invention relates to apparatus for producing an electrical output that accurately corresponds to the speed of rotation of a rotatable member; and the invention is more particularly concerned with electrical output apparatus of that type wherein the electrical output is of such character as to be relatively immune to interference and is in such form that the speed information which it contains is both very accurate and very quickly available.

One type of apparatus heretofore proposed for producing an electrical output that corresponds to the speed of rotation of a rotatable member is illustrated by German Pat. No. 864,327. As therein disclosed, a scanning disc that rotates in synchronism with the rotatable member is interposed between a photoresponsive device and a light source of substantially constant intensity that is beamed towards the photoresponsive device. The disc has circumferentially equispaced holes which are equidistant from its rotational axis and through which light from the light source can pass to the photoresponsive device. Between the holes are opaque portions of the disc that prevent such passage of the light; hence, as the disc rotates, the output of the photoresponsive device consists of a series of electrical pulses, each produced when one of the holes in the disc comes into alignment with the light source and the photoresponsive device. The frequency of the pulsed output corresponds to the speed of rotation of the disc. For practical applications, the output frequency can be compared with a reference frequency to produce a control signal or an error signal that corresponds to the difference between actual speed of the disc and a desired speed thereof.

Apparatus of the general type just described has the advantage that its output is not subject to interference from sources that commonly create difficulties with rotational speed signal devices operating on other principles. Because such photoelectric scanning apparatus need not have any magnetic parts, it is available for many applications in which other types of speed signal apparatus can not be used.

Heretofore, however, the output signal from a photoelectric speed signal device has been of such character that it did not provide information about rotational speed as quickly and as accurately as was necessary for certain applications. For example, when apparatus of the above described general character is applied to controlled anti-skid braking of a vehicle wheel, so as to prevent wheel locking during hard braking, it is essential that information about the instantaneous speed of the rapidly accelerating or decelerating wheel be obtained very quickly, and that such information be very accurate, inasmuch as signals containing the information are utilized to produce rapidly changing outputs that cause braking forces upon the wheel to be increased or diminished as necessary to maintain optimum braking effectiveness.

The present invention proceeds from a recognition that apparatus of the above-described general character can be caused to generate rotational speed information that is both more accurate and more quickly available if its output signal that contains such information is given a particular form. Specifically, if the signal consists of pulses at one level (zero pulses) that alternate with pulses at another level (one pulses), and the apparatus is so arranged that at any constant speed of rotation all such pulses — both zero and "one" — have a uniform duration, then the duration of a single pulse — either zero or one — is in itself an accurate denominator of rotational speed.

Hence it is one object of the present invention to provide apparatus by which such uniform-duration one and zero pulses can be produced at a constant speed of rotation of a rotatable member.

More specifically, it is an object of the invention to provide apparatus for producing a pulsing electrical output that accurately corresponds to the speed of rotation of a rotatable member, and which apparatus is of the photoelectric scanning type that comprises, in general, a light source of constant intensity, a photoelectric element towards which the light source is beamed, and a disc which is constrained to rotate in synchronism with the rotatable member and which is interposed between the light source and the photoresponsive element, said disc having circumferentially alternating opaque and transparent areas which cause the photoelectric element to issue alternating zero and one pulses that are all of uniform duration when the rotational speed of the disc is constant.

The attainment of the last stated object in itself presents a problem that has no commercially practical obvious solution. A photoelectric device comprising a photo transistor has a form of inertia or hysteresis such that there is a delay between the instant it receives a light impulse and the instant it begins to conduct and thus emit a signal responsive to that light impulse. There is also a delay or time lag in its response in the opposite direction, that is, it does not stop conducting until a short time after light has been blocked from it.

These two delay or retardation times are almost always different from one another for a given photo transistor. Furthermore, the retardation times vary not only with different makes and types of transistors but also as between transistors that are otherwise identical with one another in all other respects.

In theory, therefore, it might be possible to design a scanning disc having alternating opaque and transparent areas that are so matched to one another with regard to their size (as measured circumferentially of the disc) as to compensate for the retardation times of a particular photo transistor. But to do this on a commercial production basis would be economically impracticable because a standardized disc could be usable with only a limited number of transistors that would have to be hand picked for retardation times that matched those for which the disc was designed.

Having in mind these facts about photo transistor retardation times, it is another object of this invention to provide apparatus of the character described that produces one and zero pulses that are of equal and uniform durations at a constant rotational speed of a rotatable member, and which apparatus comprises a simple scanning disc that can be standardized for use with any and all photo transistors, and means providing for a simple and easily performed adjustment that accommodates and compensates for the retardation time characteristics of any particular photo transistor that may be used with the disc.

Another and more specific object of the invention is to provide a device for producing an electrical output that always accurately corresponds to the speed of rotation of a scanning disc that is interposed between a light source and a photoresponsive element, wherein accuracy of response does not depend upon close clearances between the disc and the stationary parts that cooperate with it, and wherein the electrical output is of a type that is inherently immune to adverse effects from electrical intereferences of all kinds.

With these observations and objectives in mind, the manner in which the invention achieves its purposes will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a plan view of a segmental portion of a scanning disc that comprises a part of apparatus embodying the principles of this invention, shown in relation to other components of the apparatus that cooperate with the disc;

FIG. 2 is a vertical sectional view through the portion of the apparatus shown in FIG. 1, illustrated with certain of the associated electrical circuitry, which is shown diagrammatically;

FIG. 3 illustrates pulse trains obtained under each of three different rotational speed conditions with the apparatus of this invention;

Figure 4:
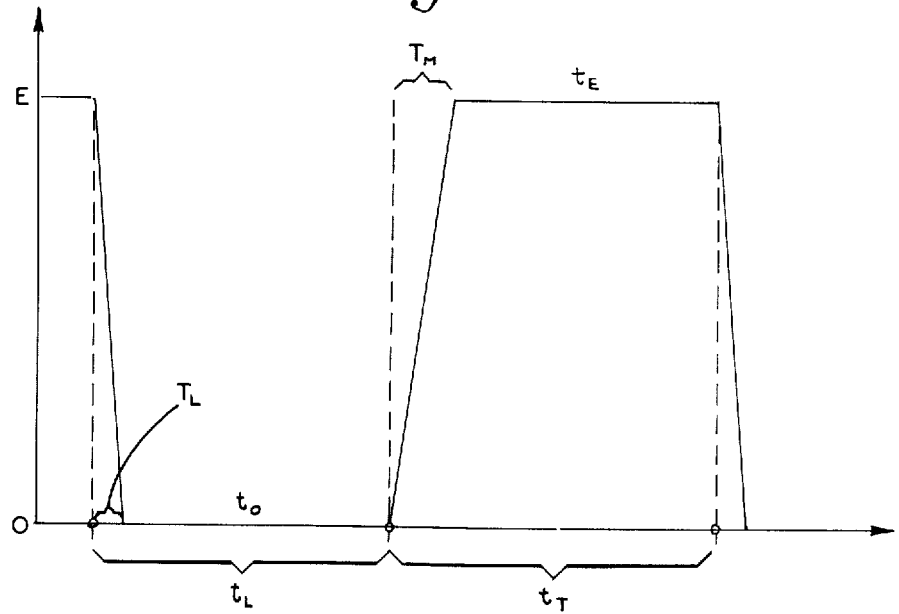
Figure 5:
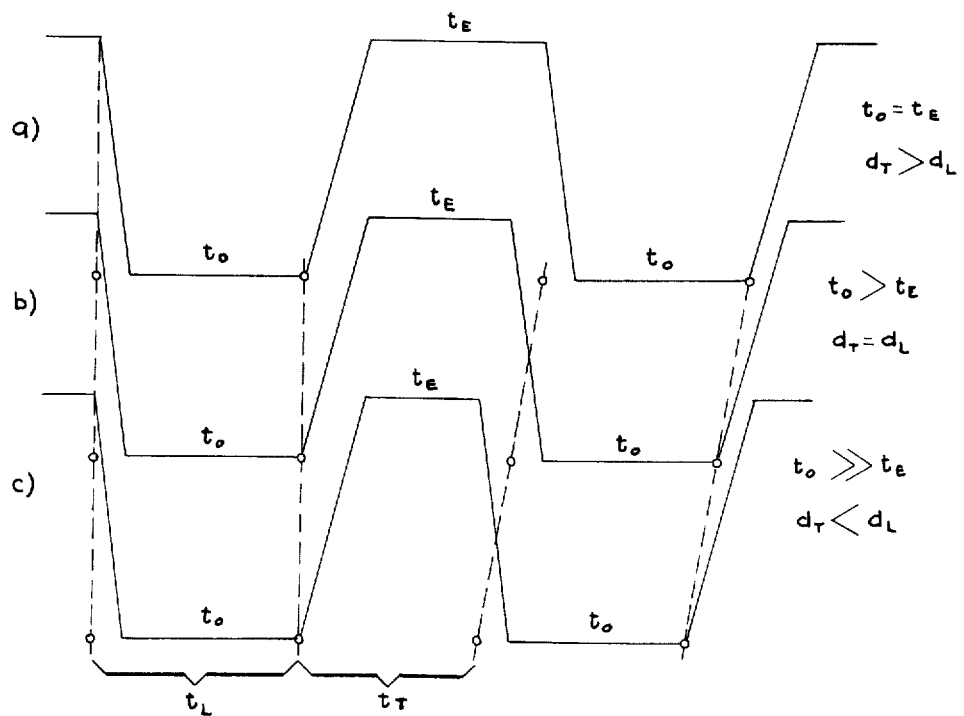

FIG. 4 is a diagram schematically showing the electrical output of a typical photo transistor comprising a part of apparatus embodying the invention, in relation to the changing value of light falling upon the transistor, illustrating the retardation times of the transistor; and FIG. 5 is a diagram showing how the apparatus of the invention can be adjusted so that the "zero" and "one" electrical pulses issued from its photo transistor can have their durations varied relative to one another, to compensate for the retardation times of the particular transistor.

Referring now to the accompanying drawings, the numeral 1 designates a rotatable member that is to be monitored, with respect to its rate of rotation, by means of apparatus embodying the present invention. The rotatable member 1 is illustrated as a spindle or axle that is journaled in a bearing housing 2. A thin, flat scanning disc 3 of non-magnetic material is concentrically secured to one end of the spindle by means of a number of screws 2, so that the disc is constrained to rotate in unison with the spindle.

Cooperating with the disc 3 to provide an output that corresponds to the rate of spindle rotation are a light source S and a light detector M, which are mounted at opposite sides of the disc. The marginal portion of the disc, which is interposed between the light source S and the detector M, is serrated, being formed with circumferentially equispaced tooth-like opaque areas 5 that are separated by spaces 6 which constitute transparent areas. The shapes of the areas 5 and 6, which are an important feature of the invention, are described below; but at this point it might be noted that both types of areas extend radially of the disc to opposite sides of a circle 7 which is concentric with the disc and which can be considered a pitch circle.

The light source S and the photo-responsive detector M are mounted in fixed relation to one another and the bearing housing 2 on a yoke 8 which is made of an electrically non-conducting material and which straddles the marginal portion of the disc. The legs 9 and 10 of the yoke 8 overlie the opposite faces of the disc with ample clearance from them, and the bight portion of the yoke is likewise spaced well clear of the disc periphery. Bores 11 and 12 in the respective legs 9 and 10 of the yoke have a common axis that is normal to the faces of the disc. At their ends remote from the disc those bores respectively open to coaxial counterbores 13 and 14. The light source S, which emits a steady light of constant intensity and can be a light emitting diode, is housed in the counterbore 13. The light detector M, here illustrated as a photo transistor, is housed in the counterbore 14 at the other side of the disc. The coaxial bores 11 and 12, which are generally aligned with the serrated marginal portion of the disc, cooperate to beam light from the source S towards the detector M; but of course such light can pass to the detector only when a transparent area 6 is in register with the bores 11 and 12, being screened from the detector by any one of the opaque areas 5.

A battery 15 provides a source of electrical energization for the light emitting diode S and for an output circuit comprising the photo transistor M. A conductor 16 connects the positive terminal of the battery with one terminal of the light emitting diode and, through a resistor 17, with the collector of the photo transistor. The negative terminal of the battery is connected, by means of a conductor 18, with the other terminal of the light emitting diode and with the emitter of the photo transistor. An output conductor 19, having a connection common to the resistor 17 and the collector of the photo transistor, leads to an electronic pulse registering device (not shown) or similar apparatus for utilizing the pulsed output of the photo transistor. (A suitable pulse registering device is disclosed in Swedish Patent Application No. 7,301,592-7)

It will be apparent that when a tooth gap or transparent area 6 of the disc is aligned with the light emitting diode S and the photo transistor M, light will fall upon the transistor to render the same conductive. The value of the resistor 17 is so chosen that when the photo transistor is conducting, the voltage at the junction of that resistor with the transistor collector will be near zero; hence a zero pulse will appear on the output conductor 19, which pulse will have a duration roughly equal to the time that light falls on the transistor. Conversely, when light is blocked from the photo transistor by the intervention of a tooth or opaque area 5 of the disc, the transistor will become non-conductive and a maximum voltage will be manifested at the output conductor 19, comprising a one pulse that has a duration roughly equal to the duration of light blockage.

Mounting means 20 for the yoke enables it to be adjustingly moved in a pair of opposite directions along a radius from the axis of the spindle 1. The adjustable mounting means 20 is shown as comprising a straight arm 21 which has one end portion fixed to the yoke and which projects therefrom lengthwise parallel to the radius just mentioned. The projecting portion of the straight arm 21 flatwise overlies one leg of an L-shaped bracket 23. The other leg of that bracket extends lengthwise parallel to the axis of the spindle 1 and is secured to the bearing housing 2 in flatwise overlying relation to a surface thereof. The straight arm 21 of the mounting means 20 has a lengthwise elongated slot 22 therein, through which extend a pair of screws 24 that are received in threaded holes in the flatwise adjacent leg of the L-shaped bracket 23. The slot 22 is so located that when the screws 24 are equistant from the adjacent ends of the slot, the yoke 8 is in a position in which the pitch circle 7 is intersected by the common axis of the bores 11 and 12 in the legs 9 and 10 of the yoke. Furthermore, the slot 22 is long enough so that when the screws 24 are loosened, the yoke can be moved a substantial distance $\Delta R$ to each side of the position just mentioned.

The provision for such adjustment of the yoke cooperates with the above mentioned distinctive configurations of the opaque and transparent areas 5 and 6 of the disc to allow compensation to be very quickly made for the peculiarities in the retardation times of any particular photo transistor.

It will be observed that each of the areas 5 and 6 is very roughly quadrangular, and that all such areas lie in an annular zone which is concentric to the disc. The inner circumference of that zone is defined by the radially inner edges of the gaps or transparent areas 6, while the outer circumference of that zone is defined by the periphery of the disc or, more accurately, by the radially outer edges of the tooth-like opaque areas 5. Note that the inner and outer circumferences just mentioned are equidistant from the pitch circle 7.

Each transparent area 6 is defined from the two opaque areas 5 that are circumferentially adjacent to it by straight edges, and it is to be observed that those two straight edges are parallel to a radius of the disc that lies midway between them. This is to say that each of the transparent areas 6 can be regarded as truly rectangular, with its side edges at right angles to its inner edge; but each of the opaque areas or teeth 5 is somewhat keystone shaped, tapering radially inwardly toward the disc axis. As the description proceeds, it will become apparent that this relationship could be reversed, that is, the opaque areas 5 could be rectangular while the transparent areas 6 would be keystone shaped.

Of course all opaque areas 5 are uniform with one another as to size and shape, and all transparent areas 6 are likewise uniform with one another.

It is significant, however, that on the pitch circle, all areas — both opaque and transparent — are of uniform width as measured circumferentially of the pitch circle. On any circle which is concentric to the disc axis and which lies radially inwardly of the pitch circle, the opaque areas are narrower than the transparent areas, again, as measured circumferentially along such inner circle. Conversely, on any concentric circle having a greater radius than the pitch circle, the opaque areas are wider than the transparent areas.

In any case the width of each transparent area should be somewhat greater than the diameter of the coaxial bores 11 and 12.

In FIG. 4, the output signal that appears on the output conductor 19 is shown in relation to a transparent area and an adjacent opaque area as those areas are carried across the light beam along the bores 11 and 12 in consequence of rotation of the disc at a constant speed. Time is plotted horizontally, signal voltage vertically. The time during which the transparent area is aligned with the beam is designated $t_L$. Note that the corresponding zero value of the output signal begins after a retardation time interval $T_L$ following alignment of the transparent area with the beam, so that the duration of that zero pulse is as designated by $t_o$. Similarly, an opaque area blocks the beam during the time interval $t_T$, and the corresponding one pulse begins after a retardation interval $T_M$ and has a duration denoted by $t_E$. (In the figure, both of the retardation times are considerably exaggerated, for clarity)

FIG. 5 illustrates the same relationship as FIG. 4, taken for each of three positions of adjustment of the yoke, and assuming that the photo transistor has the retardation times illustrated in FIG. 4. In the position designated by $b$, the periods of passage and of blockage of the light beam (respectively denoted by $d_T$ and $d_L$) are equal. Since the retardation time $T_M$ for the one voltage is greater than the retardation time for the zero voltage, the zero voltage pulse will be longer than the one voltage pulse. When the yoke is moved radially inwardly relative to the disc, to the position denoted by $c$, the intervals of blocking of the beam are shortened relative to the intervals of beam passage, and the inequality between the zero and one voltage pulses is increased. However, as the yoke is moved to a position in which the axis of the bores 11 and 12 is some distance radially outward of the pitch circle 7, the greater width of the opaque areas 5 at this radius causes the intervals of blocking of the beam to be longer than the intervals of beam passage, and the difference between those intervals is equal to the difference between the retardation times $d_T$ and $d_L$, with the result that (still assuming a constant speed of disc rotation) the zero pulses and the one pulses will all be of exactly the same duration.

The yoke 8 can be very quickly and easily adjusted the correct position for a given photo transistor with the use of an oscilloscope connected with the output signal conductor 19. while the disc is rotated at a constant speed, the position of the yoke is adjusted until the zero pulses 26 and the one pulses 27 are found to be of equal duration, as illustrated by the pulse train 28 illustrated in FIG. 3.

With yoke properly adjusted, and with the disc decelerating, the pulses continuously increase in duration, as exemplified by the pulse train 29 in FIG. 3. Acceleration of the disc gives rise to a pulse train 30 in which successive pulses are of decreasing duration.

As can be seen from FIG. 3, the pulses are well defined both with regard to amplitude and duration, owing to their nearly vertical flanks.

Once apparatus embodying the invention has been properly adjusted, a change in the rotational speed of the disc can be detected and accurately evaluated after only a few opaque and transparent areas have passed the beam through the aligned bores 11 and 12. The accuracy of the device is not significantly affected by a clearance of as much as several millimeters between the legs 9 and 10 of the yoke and the disc faces, nor by any distortion of the disc that is of the same order of magnitude, nor by normal bearing play in radial directions.

Since the apparatus contains no magnetic material and involves no magnetism, it is not affected by inductive interference of stray magnetic fields and has no tendency to attract particles for the surrounding air. In fact, as the disc rotates, the tooth-like opaque areas and the gaps between them generate an air current that helps to keep dust and dirt off of the yoke surfaces that face the disc. It is also apparent that the output produced by the apparatus is virtually immune to disturbance or distortion inasmuch as no high voltage levels are associated with the apparatus to give rise to such interference.

From the foregoing description taken with the accompanying drawings it will be apparent that this invention provides apparatus for producing an output signal that accurately corresponds to the rotational speed of a rotatable member, which signal is in such form that the speed information contained in it is very quickly available. It will also be apparent that the invention provides photoelectric signal generating apparatus for monitoring the rotational speed of a scanning disc and producing an output of alternating zero and one pulses, which apparatus is readily adjusted to compensate for retardation times of any particular photo transistor, so that such pulses will all be of the same duration when the disc rotates at a steady speed.

Those skilled in the art will appreciate that the invention can be embodied in forms other than as herein disclosed for purposes of illustration.

The invention is defined by the following claims:

1. Apparatus for producing electrical output pulses at a rate that corresponds to the rotational speed of a rotatable member, and which apparatus comprises a light source for producing a constant intensity beam of light, a photoresponsive device towards which said beam of light is directed and which produces a pulsed electrical output having one level when said beam falls thereon and having another level when said beam is blocked therefrom but the output of which may have unpredictable delays in response to intensity changes in the light striking it, and a disc constrained to rotate with said member and interposed between said light source and said photoresponsive device, said disc having circumferentially alternating transparent areas and opaque areas which respectively pass said beam and block it, said apparatus being characterized by:
   A. all of said areas being in an annular zone concentric to the disc that is defined by an inner circle of one radius and an outer circle of substantially larger radius, and each of said areas extending radially of the disc from one to the other of said circles;
   B. each said area of one kind being defined from its circumferentially adjacent areas of the other kind by straight edges that are parallel to one another to a radius of the disc and equidistant from said radius, so that every area of said one kind is substantially rectangular and every area of said other kind is substantially wedge-shaped and tapers radially inwardly;
   C. all of said areas having a uniform width as measured along the circumference of a concentric circle having a radius intermediate those of said inner and outer circles; and
   D. said light source and said photoresponsive device being supported by mounting means by which they are fixed in relation to one another but which is adjustable relative to the disc in opposite directions along a radius of the disc, so that by such adjustment the light source and the photoresponsive device can be readily brought to a position relative to the disc axis such that at a constant speed of disc rotation outputs of said two levels, alternating with one another, are of equal duration irrespective of delays in response of the photoresponsive device to changes in the amount of light striking it.

2. In rotational speed information apparatus of the type comprising a light source for producing a substantially constant intensity light emission, and a photoresponsive device which responds to reception of light emission from said source with an electrical output of one level and to non-reception of such emission with an electrical output of another level but which may have unpredictable and unequal inherent delays in its responses to the beginning and ending, respectively, of its reception of such emission, means for causing the output of said photoresponsive device to correspond to the rotational speed of a rotatable member and to consist of pulses at one of said levels alternating with pulses at the other of said levels, the pulses of each level being equal in duration to those of the other level when the rotational speed of said member is constant so that both the frequency and the duration of pulses of each level at all times accurately correspond to the existing rotational speed of said member, the last named means comprising:
   A. a disc rotatable about an axis and constrained to rotate with the rotatable member, said disc having an annular zone, concentric to said axis and defined by an inner circle of one radius and an outer circle of larger radius, in which there are circumferentially alternating transparent and opaque areas,
   1. each area of one of said kinds being defined from its circumferentially adjacent areas of the other of said kinds by opposite edges that are parallel to one another and equidistant from said radius to a radius from said axis,
   2. each area of each of said kinds being uniform with all other areas of its kind, and
   3. all of said areas being of equal circumferential extent on a median circle which is concentric to said axis and has a radius intermediate the radii of the inner and outer circles;
   B. supporting means fixing the light source and the photoresponsive device in such alignment with one another as provides for reception by the device of light emissions from the light source and in such spaced apart relationship that said zone of the disc is interposed between them for intermittent interruption of such reception during rotation of the disc; and
   C. mounting means confining said supporting means to adjusting motion in directions radial to the disc axis by which the light source and photo-responsive device can be established at the position between the inner and outer circles at which said delays are compensated for by differences between the circimferential extents of the respective kinds of areas, said mounting means providing for fixing the supporting means in any such position of adjustment.

* * * * *